United States Patent [19]

Yabuuchi et al.

[11] Patent Number: 5,494,769

[45] Date of Patent: Feb. 27, 1996

[54] POLYUREA-COVERED PARTICLE HAVING NARROW PARTICLE SIZE DISTRIBUTION AND ITS PRODUCTION

[75] Inventors: Naoya Yabuuchi, Suita; Shinichi Ishikura, Tsuzuki, both of Japan

[73] Assignee: Nippon Paint Co., Ltd., Osaka, Japan

[21] Appl. No.: 179,206

[22] Filed: Jan. 10, 1994

[30] Foreign Application Priority Data

Jan. 11, 1993 [JP] Japan .................................. 5-002534

[51] Int. Cl.⁶ ........................................ G03G 9/093
[52] U.S. Cl. .................. 430/110; 430/111; 430/137; 430/138; 428/356; 428/402; 428/402.21; 428/402.22; 524/589; 524/700; 524/716; 528/62; 427/213.34
[58] Field of Search ............... 528/62; 430/138, 430/137, 110, 111; 428/356, 402, 402.21, 402.22; 524/589, 700, 716; 427/213.34

[56] References Cited

U.S. PATENT DOCUMENTS

| | | | |
|---|---|---|---|
| 4,428,983 | 1/1984 | Nehen et al. | 427/213.34 |
| 4,758,506 | 7/1988 | Lok et al. | 430/903 |
| 5,008,325 | 4/1991 | Soto et al. | 524/504 |
| 5,139,915 | 8/1992 | Moffat et al. | 430/110 |

FOREIGN PATENT DOCUMENTS

| | | |
|---|---|---|
| 0088566 | 9/1983 | European Pat. Off. . |
| 2142255 | 1/1985 | United Kingdom . |

*Primary Examiner*—James J. Seidleck
*Assistant Examiner*—Duc Truong
*Attorney, Agent, or Firm*—Wenderoth, Lind & Ponack

[57] ABSTRACT

The present invention provides a polyurea-covered particle having a narrow particle size distribution, which comprises a vinyl polymer particle as a seed particle and a polyurea cover layer formed on the vinyl polymer particle. The present invention also provides a process for producing the polyurea-covered particle having a narrow particle size distribution, which comprises:

dispersing vinyl polymer particles having a narrow particle size distribution in an aqueous medium, adding thereto a polyisocyanate compound to swell the vinyl polymer particles, and adding a polyamine compound to effect interfacial polymerization.

7 Claims, No Drawings

POLYUREA-COVERED PARTICLE HAVING NARROW PARTICLE SIZE DISTRIBUTION AND ITS PRODUCTION

FIELD OF THE INVENTION

The present invention relates to a polyurea-covered particle having a narrow particle size distribution and a process for producing the same.

BACKGROUND OF THE INVENTION

Particles which have a weight average particle size of 1.0–30.0 μm and a particle size distribution variation coefficient of less than 20% are widely used for various applications such as a carrier of a diagnostic agent used for clinical test, a spacer for a liquid crystal display, powder ink, etc. However, particles suitable for such applications, which satisfy the requirement of both heat resistance and solvent resistance, have not been developed yet.

For instance, Makromol. Chem. 1979, 180–737, discloses vinyl polymer gel particles which are crosslinked with divinylbenzene, by way of seed polymerization. However, the particles thus obtained are not suitable for the above mentioned applications, because they neither satisfy the requirements of heat resistance and solvent resistance nor have poor mechanical strength.

Japanese Kokai Publication Sho 4(1992)-211415 discloses vinyl polymer gel particles which are obtained by interfacial polymerization. The particles obtained thereby may have superior heat resistance and solvent resistance by choosing appropriate monomers, but have very broad particle size distribution and it is very difficult to apply them to the above mentioned application.

SUMMARY OF THE INVENTION

The present invention provides a polyurea-covered particle having a narrow particle size distribution, which comprises a vinyl polymer particle as a seed particle and a polyurea cover layer formed on the vinyl polymer particle.

The present invention also provides a process for producing the polyurea-covered particle having a narrow particle size distribution, which comprises:

dispersing vinyl polymer particles having a narrow particle size distribution in an aqueous medium, adding thereto a polyisocyanate compound to swell the vinyl polymer particles, and adding a polyamine compound to effect interfacial polymerization.

In order to obtain sufficient heat resistant and solvent resistant, the present inventors have conceived that polyurea is covered on particles. The present inventors have also developed a novel process wherein an isocyanate compound is added to vinyl polymer particles having a narrow particle size distribution which had been preliminarily synthesized, to swell them and then a polyamine compound is added thereto to conduct interfacial polymerization, using the swollen polymer particles having narrow particle size distribution as seed particles, in order to obtain narrow-particle size distribution which has not been obtainable by the ordinary interfacial polymerization.

DETAILED DESCRIPTION OF THE INVENTION

The seed particles to be used in the production process of the present invention are vinyl polymer particles having narrow particle size distribution, which are synthesized by well known methods (such as, methods disclosed in Japanese Kokai Publication Sho 63 (1988)-304002 and Hei 1 (1989)-118505, corresponding U.S. Pat. No. 5,059,505). To be more specific, the vinyl polymer particles having a narrow particle size distribution are prepared by emulsion polymerization or dispersion polymerization. It is preferred that the vinyl polymer particles having narrow particle size distribution have a weight average particle size of 0.5–25 μm, more preferably 2–10 μm. When the particle size is less than 0.5 μm, a large amount of emulsifier is required when adding the polyisocyanate compound for swelling of the polymer particles and consequently a reaction between the polyisocyanate compound and water as a solvent medium will occur to cause danger. When the particle size is over 25 μm, aggregation of particles occurs at the step of swelling. It is also preferred that the vinyl polymer particles having a narrow particle size distribution have a molecular weight of 2,000–200,000, most preferably 4,000–40,000. When the molecular weight is less than 2,000, it becomes difficult to control the synthesis of seed particle, whereas if the molecular weight is over 200,000, swelling of the polymer particles with the polyisocyanate compound becomes difficult. The vinyl polymer particles having narrow particle size distribution may be prepared from various vinyl monomers, for example, an aromatic vinyl compound (such as, styrene, α-methylstyrene, p-methylstyrene, m-methylstyrene, o-methylstyrene, etc), (meth)acrylates (such as, methyl methacrylate, methyl acrylate, ethyl methacrylate, ethyl acrylate, butyl methacrylate, butyl acrylate, 2-ethylhexyl acrylate, trifluoroethyl methacrylate, etc), (meth)acrylamides (such as, acrylamide, methacrylamide, N-methyl acrylamide, N-benzyl methacrylamide, etc) and the like. Preferred vinyl polymer particles are polystyrene particles.

Firstly, the vinyl polymer particles having a narrow particle size distribution are dispersed in an aqueous medium. The method of dispersion is not particularly limited, but particles synthesized, for instance, in water medium are taken as they are or, if necessary, stabilized by addition of an appropriate amount of aqueous polymers. When particles are formed in non-aqueous medium, they may be used as they are or preferably substituted by water using a method, such as centrifugal separation, ultrafiltration, etc.

The polyisocyanate compound is added to the dispersion liquid of vinyl polymer particles obtained above. The polyisocyanate compound is well-known and not particularly limited, but since it is added to an aqueous medium, it is preferred that the compound has relatively low reactivity with water. The isocyanate compound may be selected from the group consisting of isophorone diisocyanate, tetramethylxylene diisocyanate and their oligomers. The oligomers may be generally those that the isocyanate compound is added to ethylene glycol, propylene glycol, trimethyl propane, etc.

The vinyl polymer particles are swollen by adding the polyisocyanate compound. The method of swelling may be well-known, but the process described in the aforesaid Makromol. Chem. 1979. 180,737 may be too complicated to practice. According to the present invention, it is preferred that a water-soluble polymer having a cloud point is contained together with the isocyanate compound, so that the aforesaid complicated process may be simplified. In this case, the isocyanate compound is emulsified in the aqueous medium which contains the water-soluble polymer having a cloud point to form an emulsion which is then mixed with the dispersion liquid of the vinyl polymer seed particles and swollen at the temperature of above the cloud point.

The water-soluble polymer having a cloud point is well-known, but for example, celluloses (such as hydroxypropyl cellulose, methyl cellulose, etc), and polyvinyl alcohols having a saponification degree of 70–80 mol. % can be used. It has not been clarified what function this aqueous polymer having a cloud point performs, but the present inventors believe that the polyisocyanate compound is protected by the aqueous polymer having a cloud point and swelling is effected by the sedimentation of the polymer compound on the vinyl polymer seed particles through insolubilization of the polymer compound at the temperature of above the cloud point. The concentration of the water-soluble polymer having a cloud point in the system may be 1.0–10 wt. %, preferably 1.5–5.0 wt. %. At the concentration of less than 1.0 wt. %, swelling effect is insufficient, while at the concentration of over 10 wt. %, aggregation of particles occurs severely. At the step of the aforesaid swelling, an organic solvent, such as toluene or ethyl acetate may be mixed therewith to adjust a viscosity of the polyisocyanate compound.

A weight ratio of the polyisocyanate compound / the seed particles is preferably 5/95–95/5, most preferably 10/90–80/20. When there is too much polyisocyanate compound, uniform swelling is difficult whereas if it is too little, the function of the polyisocyanate compound severely decreases.

The polyamine compound is added to the dispersion liquid of the polymer particles swollen as described above and interfacial polymerization is effected by a conventional method. The polyamine compounds to be used are well-known, for example, hexamethylenediamine, diethylenetriamine, tetramethylenepentamine, imino-bis-propylamine, 2-aminomethylpiperidine, homopiperazine, 2,6-dimethylpiperazine, etc. An amount of the polyamine compound is not particularly limited, but may be 50–150 mol. %, more preferably 85–110 mol. %, based on the total amount of the polyisocyanate compound.

According to the above method, the polyurea-covered particles having narrow particle size distribution, comprising vinyl polymer particle as seed particle and polyurea cover layer formed on the vinyl polymer particle are obtained. The resulting particles have a weight average particle size of 1.0–30.0 μm, preferably 1.5–15 μm and a particle size distribution variation coefficient of less than 20%, preferably less than 8%. If particle size is outside the above range, its applications to various usages become difficult.

According to the present invention, particles having a particle size of 0.1–30.0 μm, sufficient heat resistance and solvent resistance and a narrow particle size distribution are obtained. The particles are suitable for various applications such as a carrier of a diagnostic agent used for clinical test, a spacer for a liquid crystal display, powder ink, etc.

EXAMPLES

The present invention is described in further detail in reference to the Examples. However, it should not be so construed that the present invention is limited to these examples. Particle size and molecular weight in Examples and Comparative Examples are all based on weight average.

Preparation Example 1

Preparation of vinyl polymer particles

| Components | Weight parts |
| --- | --- |
| Ethanol | 600 |
| Methyl cellosolve | 250 |
| Polyvinyl acetate (molecular weight 45000) | 15.0 |
| Lauroyl peroxide | 1.5 |
| V-40*[1] (azo polymerization initiator) | 6.0 |
| Styrene monomer | 150 |

*[1]Available from Wako Junyaku K.K.

With the above composition, polymerization was effected at 85° C. for 20 hrs, to obtain polystyrene particles of a narrow particle size distribution, which has a particle size of 4.5 μm, a variation coefficient of 4.7% and a molecular weight of 14,400. NaOH was added thereto to convert polyvinyl acetate into polyvinyl alcohol and by repeating centrifugal separation, solvent was gradually substituted by water to obtain a 10% dispersion liquid of the particles.

Preparation Example 2

Preparation of vinyl polymer particles

Vinyl polymer particles were prepared as generally described in Preparation Example 1, with the exception that 450 parts by weight of ethanol and 400 parts by weight of methyl cellosolve were employed in the same components. The resulting polystyrene particles had a particle size of 11.2 μm, a variation coefficient of 8.6 and a molecular weight of 12,400.

Preparation Example 3

Preparation of vinyl polymer particles

| Components | Weight parts |
| --- | --- |
| n-Propanol | 765 |
| Ion-exchanged water | 85 |
| Polyvinyl acetate (molecular weight 28000) | 15 |
| Lauroyl peroxide | 1.5 |
| V-40 (azo polymerization initiator) | 4.5 |
| Styrene monomer | 135 |
| 2-Ethylhexyl acrylate | 15 |

Vinyl polymer particles were prepared as generally described in Preparation Example 1, with the exception that the above mentioned components were employed. The resulting particles have a particle size of 2.8 μm, a variation coefficient 12.6% and a molecular weight of 20,840.

Example 1

| Components | Weight parts |
| --- | --- |
| Tetramethylxylene diisocyanate | 20 |
| Takenate D-140 NW*[2] | 20 |

*[2]Manufactured by Takeda Chemical Industries, Ltd. (isophorone diisocyanate/trimethylolpropane adduct)

120 Parts by weight of a 10% aqueous solution of hydroxypropyl cellulose (HPC-L of Nippon Soda Co., Ltd.) was emulsified by mixing (emulsified particle size: 1.7 μm) in a TK homomixer manufactured by Tokushukika Kogyo K.K. to obtain an emulsion, to which 120 wt parts of a 5% aqueous solution of polyvinyl alcohol (PVA-217 EE manufactured by Kuraray Co., Ltd.) and further 80 wt parts of dispersion liquid of particles of Preparation Example 1 were added.

The resulting mixture was heated to 60° C., mixed for 4 hours and swelling of seed particles by the aforesaid emulsion was confined by coalter counter. The mixture was then cooled by ice to 15° C. and 55 parts of 20% aqueous solution of diethylenetriamine was dropped and agitation was continued for 3 hrs.

The size of the resulting particle was 8.2 μm and variation coefficient was 4.9% and the particle containing polyurea was obtained while the narrow particle size distribution of seed particles having been unchanged. The particles were separated by centrifuge, dried and crushed to be made into white powder.

Example 2

| Components | Weight parts |
| --- | --- |
| Isophorone diisocyanate | 20 |
| Takenate D-140 NW | 20 |

120 Parts by weight of a 5.5 % aqueous solution of methyl cellulose (METHOLOSE of Shinetsu Chemical Co., Ltd.) was emulsified by mixing (emulsified particle size: 1.6 μm) in a TK homomixer manufactured by Tokushukika Kogyo K.K. to obtain an emulsion, to which 120 wt parts of a 5% aqueous solution of PVA-217 EE and further 80 wt parts of dispersion liquid of particles of Preparation Example 2 were added.

The resulting mixture was heated to 60° C., mixed for 4 hours and swelling of seed particles by the aforesaid emulsion was confined by coalter counter. The mixture was then cooled by ice to 15° C. and 55 parts of 20% aqueous solution of diethylenetriamine/m-xylylenediamine (60/40 molar ratio) was dropped and agitation was continued for 3 hrs.

The size of the resulting particle was 19.4 μm and variation coefficient was 49.2% and the particle containing polyurea was obtained while the narrow particle size distribution of seed particles having been unchanged. The particles were separated by centrifuge, dried and crushed to be made into white powder.

Example 3

| Components | Weight parts |
| --- | --- |
| Tetramethylxylene diisocyanate | 15 |
| Takenate D-181 N[*3] | 25 |

[*3]Manufacured by Takeda Chemical Industries, Ltd. (adduct of trimethylolpropane to tetramethylxylene diisocyanate)

120 Parts by weight of a 7.5% aqueous solution of polyvinyl alcohol (78% degree of hydrolized) was emulsified by mixing (emulsified particle size: 2.0 μm) in a TK homomixer manufactured by Tokushukika Kogyo K.K. to obtain an emulsion, to which 120 wt parts of a 5.0% aqueous solution of PVA 217 EE and further 80 wt parts of dispersion liquid of particles of Preparation Example 3 were added.

The resulting mixture was heated to 60° C., mixed for 4 hours and swelling of seed particles by the aforesaid emulsion was confined by coalter counter. The mixture was then cooled by ice to 15° C. and 55 parts of 20% aqueous solution of hexamethylenediamine/tetraethylenepentamine (70/30 molar ratio) was dropped and agitation was continued for 3 hrs.

The size of the resulting particle was 5.1 μm and variation coefficient was 12.9% and the particle containing polyurea was obtained while the narrow particle size distribution of seed particles having been unchanged. The particles were separated by centrifuge, dried and crushed to be made into white powder.

Example 4

| Components | Weight parts |
| --- | --- |
| Tetramethylxylene diisocyanate | 15 |
| Takenate D-181 N | 25 |

240 Parts by weight of a 10% PVA-217 EE aqueous solution was emulsified by mixing (emulsified particle size: 2.2 μm) in a TK homomixer manufactured by Tokushukika Kogyo K.K. to obtain an emulsion, to which 80 wt parts of dispersion liquid of particles of Preparation Example 3 was added.

The resulting mixture was heated to 60° C., mixed for 4 hours and swelling of seed particles by the aforesaid emulsion was confined by coalter counter. The mixture was then cooled by ice to 15° C. and 55 parts of 20% aqueous solution of tetraethylenepentamine was dropped and agitation was continued for 3 hrs.

The size of the resulting particle was 4.6 μm and variation coefficient was 18.8% and the particle containing polyurea was obtained while the narrow particle size distribution of seed particles having been unchanged. The particles were separated by centrifuge, dried and crushed to be made into white powder.

Comparative Example 1

| Components | Weight parts |
| --- | --- |
| Styrene monomer | 50 |
| Divinyl benzene | 50 |
| Lauroyl peroxide | 0.75 |
| Ion exchanged water | 400 |
| Polyvinyl alcohol[*4] | 2.5 |
| Sodium laurylsulfate | 0.025 |

[*4]Manufactured by Kuraray as PVA 217 EE

Styrene monomer, divinyl banzene and lauroyl peroxide were mixed to obtain a uniform solution. The resulting solution was added to an aqueous solution of ion exchanged water, polyvinyl alcohol and sodium laurylsulfate, and homogenized at 4,000 rpm for 10 minutes using a homogenizer (available from Tokushu Kika Kogyo as TK). The homogenized mixture was poured into a reaction vessel and suspension-polymerized at 65° C. for 9 hours in nitrogen gal blanket. After completion of polymerization, a polymerization degree was determined by a heat air drying method at 150° C. for 1 hour to find 97.7%. The resulting particles had a particle size of 13.6 μm, a variation coefficient 32.5% and very broad particle size distribution.

Example 5

Evaluation of heat resistance of the particles obtained in Examples 1–4 and Comparative Example 1 was conducted by thermogravimetric analysis.

Measuring conditions:

N₂: 50 ml/min.

Sample amount: 10 mgr

Speed of temperature increase: 10° C./min

Temperature range: 30°–600° C.

The results are shown in Table 1.

TABLE 1

| Sample | Ex. 1 | Ex. 2 | Ex. 3 | Ex. 4 | Comp. Ex. 1 |
|---|---|---|---|---|---|
| TT1 (Weight change Temp. °C.) | 338 | 392 | 404 | 401 | 344 |
| Td (Decomposing Temp. °C.) | 438 | 436 | 446 | 439 | 396 |

As is clearly understood from the above results, the particles of the present invention had superior heat resistance to the conventional particles of Comparative Example 1.

Example 6

This example was conducted to evaluate solvent resistance.

Ten gram of the particles obtained in each of Examples and Comparative Example was added in a solvent mixture of 50 ml of xylene and 50 ml of butanol, and mixed at 90° C. for 5 hours. Change of particle shape was determined by a scanning type electron microscope and the results are shown in Table 2. The particles of Examples had no change but the particles of Comparative Example 1 changed to uncertain shape and had fusing between particles.

What is claimed is:

1. A process for production of a polyurea-covered particle having a narrow particle size distribution, comprising a vinyl polymer particle as a seed particle and a polyurea cover layer formed on the vinyl polymer particle, which process comprises:

dispersing vinyl polymer particles having a narrow particle size distribution in an aqueous medium, adding thereto a polyisocyanate compound to swell the vinyl polymer particles, and adding a polyamine compound to effect interfacial polymerization, wherein the resulting polyurea-covered particle has a weight average particle size of 1.0–30.0 μm and a particle size distribution variation coefficient of less than 20%.

2. A process according to claim 1 wherein the polyisocyanate compound is selected from the group consisting of isophorone diisocyanate, tetramethylxylene diisocyanate and their oligomers.

3. A process according to claim 1 wherein, upon adding the polyisocyanate, a water-soluble polymer having a cloud point is contained therein and the swelling is effected at a temperature above the cloud point of the polymer.

4. A process according to claim 1 wherein the water-soluble polymer having a cloud point is hydroxypropyl cellulose and/or methylcellulose.

5. A process according to claim 4 wherein the polyisocyanate compound and the water-soluble polymer having a cloud point are preliminarily emulsified in an aqueous medium and then mixed with the dispersion liquid of the vinyl polymer particle having a narrow particle distribution to swell the polymer particles at the temperature above the cloud point.

6. A process according to claim 4 wherein the water-soluble polymer is present in an amount of 0.1–10 wt. % based on the total amount of the dispersion liquid of the vinyl polymer particle having a narrow particle size distribution, the polyisocyanate compound and the water polymer.

7. A process according to claim 1 wherein the polyamine compound is selected from the group consisting of hexamethylenediamine, diethylenetriamine, tetraethylenepentamine and their mixtures.

* * * * *